March 21, 1944.

UNITED STATES PATENT OFFICE 2,344,833

TERPENE DERIVATIVE

Alfred L. Rummelsburg, Wilmington, Del., assignor to Hercules Powder Company, Wilmington, Del., a corporation of Delaware No Drawing. Application May 31, 1941,
Serial No. 396,221

15 Claims. (Cl. 260—460)

This invention relates to sulfonation products of polymers of acyclic terpenes having three double bonds per molecule. More particularly, it relates to sulfonation products of the dimers of acyclic terpenes having three double bonds per molecule.

It has been found that when acyclic terpenes having three double bonds per molecule or any of their polymeric modifications are treated with various sulfonating agents, there result new derivatives which are characterized by their possessing sudsing and wetting-out properties and which may be variously used as emulsifying agents, cleansing agents, wetting agents, etc. Techanically, these new derivatives may comprise sulfonates, sulfates, and mixtures thereof. These products may be further neutralized with inorganic or organic bases to yield compounds of increased utility as hereinafter described.

In accordance with this invention, there may be employed any acyclic terpene having three double bonds per molecule. Thus, there may be employed allo-ocimene, ocimene, myrcene, etc. Although any of these compounds may be employed within the scope of this invention, it is preferred to employ allo-ocimene. This acyclic terpene, in addition to having three double bonds per molecule, has them in a triply conjugated position. Hereinafter, in this specification the term, acyclic terpene, will be employed for convenience to represent an acyclic terpene having three double bonds per molecule.

The particular acyclic terpene employed may be in its monomeric or polymeric form. Variously, mixtures of the monomeric and polymeric forms may be employed as may mixtures of various acyclic terpenes be employed. However, the resulting product in any instance is a sulfonation product of a polymer of the particular acyclic terpene employed. This results from the fact that the sulfonating agents employed in the process act as catalysts for the polymerization of the acyclic terpenes. This reaction takes precedence to some extent over the sulfonation reaction. Hence, the product is always substantially the sulfonation product of the polymer of the particular acyclic terpene employed.

The polymerization of the acyclic terpenes may be accomplished by any of the methods known to the art. For illustration, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc., also with metal halide catalysts, such as, stanic chloride, aluminum chloride, zinc chloride, boron trifluoride and its molecular complexes with ethers and acids, etc. Furthermore, activated clays, including silica gel, fuller's earth, diatomaceous earth, activated alumina, etc. may be employed to accomplish the polymerization. The polymerization may be carried out with or without the use of an inert, volatile, organic solvent, such as, benzene, xylene, gasoline, ethylene dichloride, etc. For additional information relating to the particular procedures employed, see my co-pending applications for United States Letters Patent, Serial No. 370,664, filed December 18, 1940, and Serial No. 370,665, filed December 18, 1940.

The preferred polymerized acyclic terpene to employ in carrying out the processes of this invention is the substantially pure dimer. This results from the fact that the increased unsaturation of the dimer as compared with that of the higher polymers, facilitates the sulfonation. Thus, when polymerization is carried out with a phosphoric acid catalyst, a liquid product is formed comprising a substantial quantity of the dimer. In actual practice, the product will contain from about 75% to about 95% of the dimer, depending upon the conditions of reaction, such as, the type of phosphoric acid used, the concentration of catalyst, the particular solvent, the temperature of reaction, etc. The thiocyanate value of the product may vary from about 120 to about 240. If desired, after the catalyst has been removed, the substantially pure dimer may be separated from the remaining constituents by distillation under reduced pressure. The substantially pure dimer in the specific case of allo-ocimene will be found to have the following average characteristics:

Boiling point (4 mm.) °C 142–143
$d^{23}_0$ 0.8654
$n^{23}_d$ 1.508

In carrying out the polymerization of acyclic terpenes with metal halide catalysts, liquid polymers may also be obtained following the procedure as cited in my co-pending application for United States Letters Patent, Serial No. 370,664, filed December 18, 1940; however, by employing particular metal halides and suitably controlling the conditions of the reaction, solid polymers of acyclic terpene result. For example, when a metal chloride, and preferably aluminum chloride, is used, generally solid polymers result. These solid polymers are formed when the reaction is carried out over wide ranges of temperature and using various inert solvents. Preferably, however, to form solid polymers, the reaction is carried out at a temperature within the range of from about −35° C. to about 60° C. with the acyclic terpene dissolved in a halogenated organic solvent, such as, ethylene dichloride, etc.

These solid polymers which are prepared by the processes above described contain substantial quantities of polymeric constituents higher than the dimer. It has been determined that these organic solids have at least about 70% of polymeric constitutents higher than the dimer. They are further characterized by having lower thiocyanate values than the liquid polymers, the values for the former falling within the range of from about 20 to about 80.

In carrying out the sulfonation process in accordance with the invention, any of the monomeric or polymeric forms of acyclic terpenes, as hereinbefore described, may be sulfonated by treatment with various sulfonating agents such as chlorosulfonic acid, concentrated or fuming sulfuric acid, sulfur trioxide, acetyl sulfuric acid, etc. If desired, the sulfonation will be carried out with the allo-ocimene dissolved in a suitable inert solvent, such as, carbon tetrachloride, diethyl ether, isopropyl ether, dichloroethyl ether, ethylene dichloride, etc. The preferred solvents are the organic chlorinated solvents, such as, dichloroethyl ether, ethylene dichloride, ethyl chloride, trichloroethylene, fluoro dichloromethane, difluorochloromethane, tetrachloroethane, pentachloroethane, propylene dichloride, carbon tetrachloride, etc. Where the sulfonation is carried out without the use of an inert solvent, a liquid or gaseous sulfonating agent will be employed.

More specifically, the monomeric or polymeric acyclic terpene and the sulfonating agent, with or without the presence of an inert solvent, are agitated together at a temperature within the range of from about 0° C. to about 100° C. for a period of from about 1 hour to about 8 hours, and preferably, at a temperature within the range of from about 15° C. to about 50° C. for a period within the range of from about 2 hours to about 6 hours. Temperatures without the ranges previously disclosed and reaction periods without the ranges previously disclosed may be employed, if desired, but such operation is less satisfactory. Normally, and particularly where an inert solvent is being employed, the amount of sulfonating agent which will be used may vary from about 25% to about 100% of the weight of monomeric or polymeric acyclic terpene employed, preferably, however, it will be from about 50% to about 75% of that amount. Where, however, an inert solvent is not employed and where a liquid sulfonating agent such as sulfuric acid is, for that reason, required, the amount of sulfonating agent employed will be in excess of the aforesaid amounts. Thus, for example, the sulfonating agent may be employed in an amount between about 100% and about 600% of the monomeric or polymeric acyclic terpene. In carrying out the reaction without an inert solvent, but with a large excess of sulfonating agent, as described, the monomeric or polymeric acyclic terpene will desirably be added slowly to the sulfonating agent with agitation.

From this point, different procedures are employed in obtaining the desired product from the reaction mixture depending upon whether or not an inert solvent has been employed in the reaction. Where an inert solvent has been employed, the reaction mixture is neutralized with an inorganic base, such as, NaOH, KOH, NH₄OH, Ca(OH)₂, Na₂CO₃, etc. or an organic base, such as, aniline, pyridine, quinoline, triethanolamine, etc. In the case of the inorganic base, an aqueous solution, preferably containing from 20% to 60% base, is employed for the neutralization. Following neutralization, the inert solvent is removed by distillation, preferably in vacuo. The product may be dried in this way also, it being necessary, however, to employ temperatures below 150° C. to prevent decomposition. This product is a metal or organic salt of the sulfonate which was first formed. Any inorganic salt impurities may be removed from the product by the use of a solvent in which the impurities are insoluble.

Sometimes, where an inert solvent is employed during the sulfonation of monomeric or polymeric acyclic terpenes in accordance with the present inventive processes, two phases separate after neutralization with an aqueous solution of an inorganic base. The phase containing the inert solvent will also contain the neutralized sulfonate, and this phase may be separated from the aqueous phase prior to evaporation of the inert solvent. The inert solvent may then be removed by any desirable method to recover the salt of the sulfonate. The cause of phase separation is believed to be related to the concentration of the salt of the sulfonate in the inert solvent. The higher the concentration, the less will be the probability for phase separation.

If an inert solvent has not been employed for the reactants during sulfonation, the reaction mixture may be treated to remove unreacted sulfonating agent by adding water, preferably accompanied by agitation and cooling. It is also preferred that the dilution with water be such that the strength of the sulfonating agent in the resulting solution will be within the range of from about 30% to about 60%. The precipitated sulfonate can then be separated from the aqueous acid solution in which the sulfonate is only slightly soluble. The sulfonate can be washed with an aqueous inorganic salt solution having a concentration with respect to the salt of from 10% to 20%. Thus, aqueous NaCl, Na₂SO₄, NaNO₃, etc., may be employed. In such a salt solution, the sulfonate is substantially insoluble. If desired, the small amount of sulfonate remaining in the aqueous solution of the sulfonating agent may be precipitated by adding a quantity of the aforementioned inorganic salts. After the sulfonate has thus been isolated, it may be dissolved in water and the solution treated with any of the aforementioned inorganic or organic bases to produce the corresponding salts. The product may then be precipitated from solution by adding any of the aforementioned inorganic salts.

In will be realized from a consideration of the above processes that to obtain the sulfonate, it is required that the sulfonation be carried out without the use of an inert solvent, whereas if a salt of the sulfonate is desired, it may be obtained whether or not an inert solvent has been employed.

What has heretofore been described as a "sulfonate," will be found to comprise a mixture of what is technically a sulfonate and a sulfate. Substantially more of the sulfonate will, however, be present. Different proportions of these compounds may be present depending upon the sulfonating agent employed, the conditions of reaction, etc. Technically, a sulfonate will result as a consequence of a substitution reaction accompanied by the splitting off of $H_2O$, HCl, etc., as determined by the particular sulfonating agent used. Whereas, a sulfate can result as a consequence of an addition reaction at an ethylenic double bond. In addition, when sulfur trioxide is employed as the sulfonating agent, it is possible that a sulfonate is formed by means of its addition to a double bond. In any instance, there is, in the resulting unneutralized product a replaceable hydrogen atom. Hence, these products may be described as free acids. For convenience, wherever in this specification and claims the term "sulfonate" is employed, there is contemplated the product resulting from the treatment of an acyclic terpene in either its monomeric or polymeric forms with any of the sulfonating agents herein set forth. Also, whenever "sulfonation product" is employed, there is contemplated a term comprehensive to "sulfonate" as well as to derivatives thereof, such as, the alkali metal salts, etc.

The alkali metal and ammonium salts of the sulfonates are water-soluble. Their preparation may be accomplished by neutralizing the sulfonates with an aqueous solution of the alkali metal or ammonium in the form of a hydroxide or carbonate, etc. Organic base salts may also be formed with such organic bases as, for example, heterocyclic nitrogen compounds, as pyridine, quinoline, etc.; aliphatic amines, as methylamine, ethylamine, triethylamine, etc.; aliphatic alkylolamines, as triethanolamine, etc.; aromatic amines, as, aniline, naphthylamine, ethyl aniline, etc.

There follow several specific examples which illustrate particular embodiments of the principles underlying this invention. These examples, however, are not to be construed as being limiting. All parts and percentages in this specification are by weight unless otherwise indicated.

Example 1

Fifty parts of orthophosphoric acid polymerized alloocimene, consisting substantially entirely of the dimer, were dissolved in 250 parts of carbon tetrachloride and 25 parts of chlorosulfonic acid were added with agitation at 5° C. Agitation was continued at this temperature for 5 hours. The reaction mixture was neutralized with aqueous 15% NaOH. The $CCl_4$ was then removed by distillation at 100° C. after which the pastry residue was dried at 80° C. under a vacuum for 12 hours. A slight darkening in color of the product was noted. The product dissolved in water to give an opaque foaming solution. Using the standard cotton hank and employing the procedure of Draves and Clarkson as reported in American Dyestuff Reporter, March 30, 1931, p. 201, a solution of 24 grams of the dried material per liter of water gave a wetting-out time of 2.8 seconds. A solution of 12 grams of the dried material per liter of water gave a wetting-out time of 7.1 seconds.

Example 2

One hundred parts of orthophosphoric acid polymerized allo-ocimene, consisting substantially entirely of the dimer, were added to 350 parts of 105% sulfuric acid with agitation over a period of ½ hour. The mixture was cooled such that the temperature remained at approximately 10° C. during the addition of the allo-ocimene. Agitation was continued for a period of 6 hours at 25° C. The reaction mixture was diluted with 350 parts of water in such a manner that the temperature of the mixture was maintained at 25° C. to 40° C. The sulfonated dimeric allo-ocimene precipitated and after separation from the dilute aqueous acid was washed with 350 parts of an aqueous 15% sodium chloride solution. The precipitated was then dissolved in 500 parts of water and neutralized with sodium hydroxide using phenolphthalein as indicator. The addition of 100 parts of sodium chloride to the neutralized aqueous sulfonate solution caused the sodium salt of the sulfonate to precipitate. The precipitate was filtered off and dried. A water solution of the product exhibited strong wetting-out, emulsifying and detersive properties.

Example 3

Thirty-five parts of gaseous sulfur trioxide were absorbed by a solution of 100 parts of polymerized allo-ocimene, consisting substantially entirely of the dimer in 300 parts of carbon tetrachloride. The allo-ocimene solution was constantly agitated and the temperature maintained at 15° C. to 30° C. during the absorption period. The reaction mixture was then agitated at 25 to 30° C. for a period of 8 hours, and thereafter neutralized with 140 parts of an aqueous 50% triethanolamine solution at 25° C. to 30° C. with continued agitation. The carbon tetrachloride was removed by distillation at a bath temperature below 100° C. The resulting paste was dried under vacuum conditions at 70° C. A water solution of the product exhibited strong foaming action. The product could be employed as an emulsificant and as a detergent.

It will be understood that the details and examples hereinbefore set forth are illustrative only and that the invention as broadly described and claimed is in no way limited thereby.

This application is a continuation-in-part of my application for United States Letters Patent, Serial No. 382,945, filed March 12, 1941.

What I claim and desire to protect by Letters Patent is:

1. A sulfonation product comprising a mixture of a sulfonate and a sulfate obtained by reacting a polymer of an acyclic terpene having three double bonds per molecule, with a sulfonating agent, at a temperature of from about 0° C. to about 100° C. for a period of time of from about 1 hour to about 8 hours.

2. A sulfonation product comprising a mixture of a sulfonate and a sulfate obtained by reacting a dimer of an acyclic terpene having three double bonds per molecule, with a sulfonating agent, at a temperature of from about 0° C. to about 100° C. for a period of time of from about 1 hour to about 8 hours.

3. A sulfonation product comprising a mixture of a sulfonate and a sulfate obtained by reacting a dimer of allo-ocimene, with a sulfonating agent, at a temperature of from about 0° C. to about 100° C. for a period of time of from about 1 hour to about 8 hours.

4. A sulfonation product comprising a mixture of a sulfonate and a sulfate obtained by reacting polymerized allo-ocimene, with a sulfonating agent, at a temperature of from about 0° C. to about 100° C. for a period of time of from about 1 hour to about 8 hours.

5. A sulfonation product comprising a mixture of a sulfonate and a sulfate obtained by reacting polymerized allo-ocimene with chlorosulfonic acid, at a temperature of from about 0° C. to about 100° C. for a period of time of from about 1 hour to about 8 hours.

6. A sulfonation product comprising a mixture of a sulfonate and a sulfate obtained by reacting polymerized allo-ocimene with sulfuric acid, at a temperature of from about 0° C. to about 100° C. for a period of time of from about 1 hour to about 8 hours.

7. A sulfonation product comprising a mixture of a sulfonate and a sulfate obtained by reacting polymerized allo-ocimene with acetyl sulfuric acid, at a temperature of from about 0° C. to about 100° C. for a period of time of from about 1 hour to about 8 hours.

8. A sulfonation product comprising a mixture of a sulfonate and a sulfate obtained by reacting dimeric allo-ocimene with chlorosulfonic acid, at a temperature of from about 0° C. to about 100° C. for a period of time of from about 1 hour to about 8 hours.

9. A sulfonation product comprising a mixture of a sulfonate and a sulfate obtained by reacting dimeric allo-ocimene with sulfuric acid, at a temperature of from about 0° C. to about 100° C. for a period of time of from about 1 hour to about 8 hours.

10. A sulfonation product comprising a mixture of a sulfonate and a sulfate obtained by reacting dimeric allo-ocimene with acetyl sulfuric acid, at a temperature of from about 0° C. to about 100° C. for a period of time of from about 1 hour to about 8 hours.

11. The method of producing a sulfonation product comprising a mixture of a sulfonate and a sulfate which comprises reacting a polymer of an acyclic terpene having three double bonds per molecule with a sulfonating agent, at a temperature of from about 0° C. to about 100° C. for a period of time from about 1 hour to about 8 hours.

12. The method of producing a sulfonation product comprising a mixture of a sulfonate and a sulfate which comprises reacting a polymer of an acyclic terpene having three double bonds per molecule, which material is dissolved in an inert solvent, with a sulfonating agent at a temperature of from about 0° C. to about 100° C. for a period of time of from about 1 hour to about 8 hours.

13. The method of producing a sulfonation product comprising a mixture of a sulfonate and a sulfate which comprises reacting a polymer of an acyclic terpene having three double bonds per molecule, which material is dissolved in an inert solvent, with chlorosulfonic acid at a temperature of from about 0° C. to about 100° C. for a period of time of from about 1 hour to about 8 hours.

14. The method of producing a sulfonation product comprising a mixture of a sulfonate and a sulfate which comprises reacting a polymer of an acyclic terpene having three double bonds per molecule, which material is dissolved in an inert solvent, with sulfuric acid at a temperature of from about 0° C. to about 100° C. for a period of time of from about 1 hour to about 8 hours.

15. The method of producing a sulfonation product comprising a mixture of a sulfonate and a sulfate which comprises reacting a polymer of an acyclic terpene having three double bonds per molecule, which material is dissolved in an inert solvent, with acetyl sulfuric acid at a temperature of from about 0° C. to about 100° C. for a period of time of from about 1 hour to about 8 hours.

ALFRED L. RUMMELSBURG.